(12) United States Patent
Li et al.

(10) Patent No.: US 9,439,047 B2
(45) Date of Patent: *Sep. 6, 2016

(54) METHOD FOR PAGING-BASED DELGATE INDICATION FOR M2M GROUP

(75) Inventors: Honggang Li, Beijing (CN); Rui Huang, Beijing (CN); Shantidev Mohanty, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 13/995,147

(22) PCT Filed: Mar. 29, 2012

(86) PCT No.: PCT/US2012/031164
§ 371 (c)(1),
(2), (4) Date: Nov. 13, 2013

(87) PCT Pub. No.: WO2013/062619
PCT Pub. Date: May 2, 2013

(65) Prior Publication Data
US 2014/0056221 A1 Feb. 27, 2014

Related U.S. Application Data

(60) Provisional application No. 61/551,867, filed on Oct. 26, 2011.

(51) Int. Cl.
*H04W 4/00* (2009.01)
*H04W 4/08* (2009.01)
(Continued)

(52) U.S. Cl.
CPC .............. *H04W 4/08* (2013.01); *H04W 4/005* (2013.01); *H04W 68/025* (2013.01); *H04W 84/22* (2013.01); *H04W 88/04* (2013.01)

(58) Field of Classification Search
CPC ...................................................... H04W 80/04
USPC ........................................................ 370/328
See application file for complete search history.

(56) References Cited

U.S. PATENT DOCUMENTS

2011/0128911 A1 6/2011 Shaheen
2011/0191187 A1 8/2011 Charbit et al.
(Continued)

FOREIGN PATENT DOCUMENTS

CN 1437832 A 8/2003
CN 101227708 A 7/2008
(Continued)

OTHER PUBLICATIONS

European Search Report received for European Patent Application No. 12842959.4, mailed on Jun. 10, 2015.
(Continued)

*Primary Examiner* — Christopher R Crompton
(74) *Attorney, Agent, or Firm* — Alpine Technology Law Group LLC

(57) ABSTRACT

A machine-to-machine-type (M2M-type) device and technique comprising a transceiver at an M2M-type device that receives from a base station a paging message designating the M2M-type device to be a delegate for a group of M2M-type devices. In response, a processor of the M2M-type device generates an acknowledgement and/or an M2M-type group-based reentry communication for the transceiver to send to the base station. The base station is part of wireless network that can comprise one of a Bluetooth-based standard wireless network, an IEEE 802.11-based standard wireless network, an IEEE 802.16-based standard wireless network, an IEEE 802.18-based wireless network standard, a 3GPP LTE-based wireless network standard, a 3GPP-based protocol wireless network, a 3GPP2 Air Interface Evolution (3GPP2 AIE) based wireless network standard, a UMTS-based protocol wireless network, a CDMA2000-based protocol wireless network, a GSM-based protocol wireless network, a cellular-digital-packet-data-based (CDPD-based) protocol wireless network, or a Mobitex-based protocol wireless network.

17 Claims, 9 Drawing Sheets

(51) Int. Cl.
*H04W 68/02* (2009.01)
*H04W 84/22* (2009.01)
*H04W 88/04* (2009.01)

(56) References Cited

U.S. PATENT DOCUMENTS

| | | | |
|---|---|---|---|
| 2012/0004003 A1* | 1/2012 | Shaheen et al. | 455/509 |
| 2012/0231828 A1* | 9/2012 | Wang et al. | 455/509 |
| 2013/0029716 A1* | 1/2013 | Lee et al. | 455/519 |

FOREIGN PATENT DOCUMENTS

| | | | |
|---|---|---|---|
| WO | 01/50795 A1 | | 7/2001 |
| WO | 2008/089660 A1 | | 7/2008 |
| WO | WO 2011129575 | * | 10/2011 |
| WO | 2013/062619 A1 | | 5/2013 |

OTHER PUBLICATIONS

"Group Based Registration and Access (Device Based Operation)", Feb. 22-26, 2010, 4 pages, InterDigital, San Francisco, CA.

Hai Wang, et al., "Proposed Text for Network Reentry for a Large Number of M2M Devices", working document, Mar. 8, 2011, 7 pages, IEEE, Piscataway, NJ.

"WirelessMAN-Advanced Air Interface for Broadband Wireless Access Systems", draft amendment, Oct. 1, 2011, 63 pages, IEEE, New York, NY.

"WirelessMAN—Advanced Air Interface for Broadband Wireless Access Systems ems-Ehancement s to Support Machine-to-Machine Applications", IEEE 802. 16p-11/0033, LAN/MAN Standards Committee, Oct. 2011, 63 Pages.

"Proposed Text for network access entry for a large number of M2M devices", IEEE C802.16p-11/0131r2, Jul. 2011, 8 Pages.

International Search Report and Written opinion for PCT Patent Application No. PCT/US2012/031164, mailed Oct. 30, 2012, 11 Pages.

International Preliminary Report on Patentability received for PCT Application No. PCT/US2012/031164, mailed on May 8, 2014, 2 pages.

Written Opinion received for PCT Application No. PCT/US2012/031164, mailed on Oct. 30, 2012, 5 pages.

Office Action received for Chinese Patent Application No. 201280052638.9, mailed on Feb. 16, 2016, 18 pages including 10 pages of English translation.

* cited by examiner

PRIOR ART

METHOD FOR PAGING-BASED DELGATE INDICATION FOR M2M GROUP

TECHNICAL FIELD

Embodiments described herein are generally directed to the field of wireless communications.

BACKGROUND ART

Machine to Machine (M2M) communications can be described as a system that enables an "Internet of things," and involves information exchange between a subscriber-type station and a server device located in a core network through a base station or between subscriber-type stations that may be carried out without any human interaction.

FIG. 1 depicts an exemplary high-level system configuration for an IEEE-802.16-based M2M-type communications network 100. As shown in FIG. 1, a plurality of M2M-type devices 102 are wirelessly connected through an IEEE-802.16-type base station BS 103 to an M2M-type server 104. Each M2M-type device 102 provides IEEE-802.16-type M2M functionality. M2M-type server 104 is an entity that communicates with the one or more IEEE-802.16-type M2M devices 102. M2M-type server 103 also has an interface that can be accessed by an M2M-type service consumer 105. An M2M-type service consumer 105 is a user of M2M-type services, such as a power utility company. M2M-type server 104 may reside within or outside of a Connectivity Service Network (CSN) 106 of a mobile network 101 and provides specific M2M-type services for one or more IEEE-802.16-type M2M devices 102. An M2M-type application runs on the IEEE-802.16-type M2M devices 102 and the M2M-type server 104.

The exemplary architecture of an IEEE-802.16-based M2M-type communications system, such as that depicted in FIG. 1, supports two types of M2M-type communication. The first type of M2M-type communication is between one or more IEEE-802.16-type M2M-type devices 102 and an IEEE-802.16-type M2M-type server 104, and is indicated at 108 in FIG. 1. The second type of M2M-type communication, indicated at 109 in FIG. 1, is a point-to-multipoint communication between an IEEE-802.16-type M2M-type device 1102 and an IEEE-802.16-type base station BS 103. Additionally, the architecture of an IEEE-802.16-based M2M-type communications system allows for an IEEE-802.16-type M2M-type device 102 to act as an aggregation point for both IEEE-802.16-type M2M-type devices 102 and non IEEE-802.16-type M2M-type devices 107. The non IEEE-802.16-type M2M-type devices 107 use a different radio interface, such as an interface based on the IEEE-802.11 standard, the IEEE-802.15 standard, etc. Additionally, a peer-to-peer (P2P) connectivity between IEEE-802.16-type M2M-type devices 102 and non IEEE-802.16-type M2M-type devices 107 may also be supported (as depicted by dashed lines) in which the P2P connectivity may occur over an IEEE-802.16-based radio interface or over an alternate radio interface, such as an IEEE-802.11-based radio interface, an IEEE-802.15-based radio interface, etc.

Currently, there is no efficient way to for a base station (BS) operating in an IEEE-802.16-based communication system to designate an M2M group delegate for a group or aggregation of M2M-type and non M2M-type devices.

BRIEF DESCRIPTION OF THE DRAWINGS

Embodiments disclosed herein are illustrated by way of example, and not by way of limitation, in the figures of the accompanying drawings in which like reference numerals refer to similar elements and in which.

Figure 1:
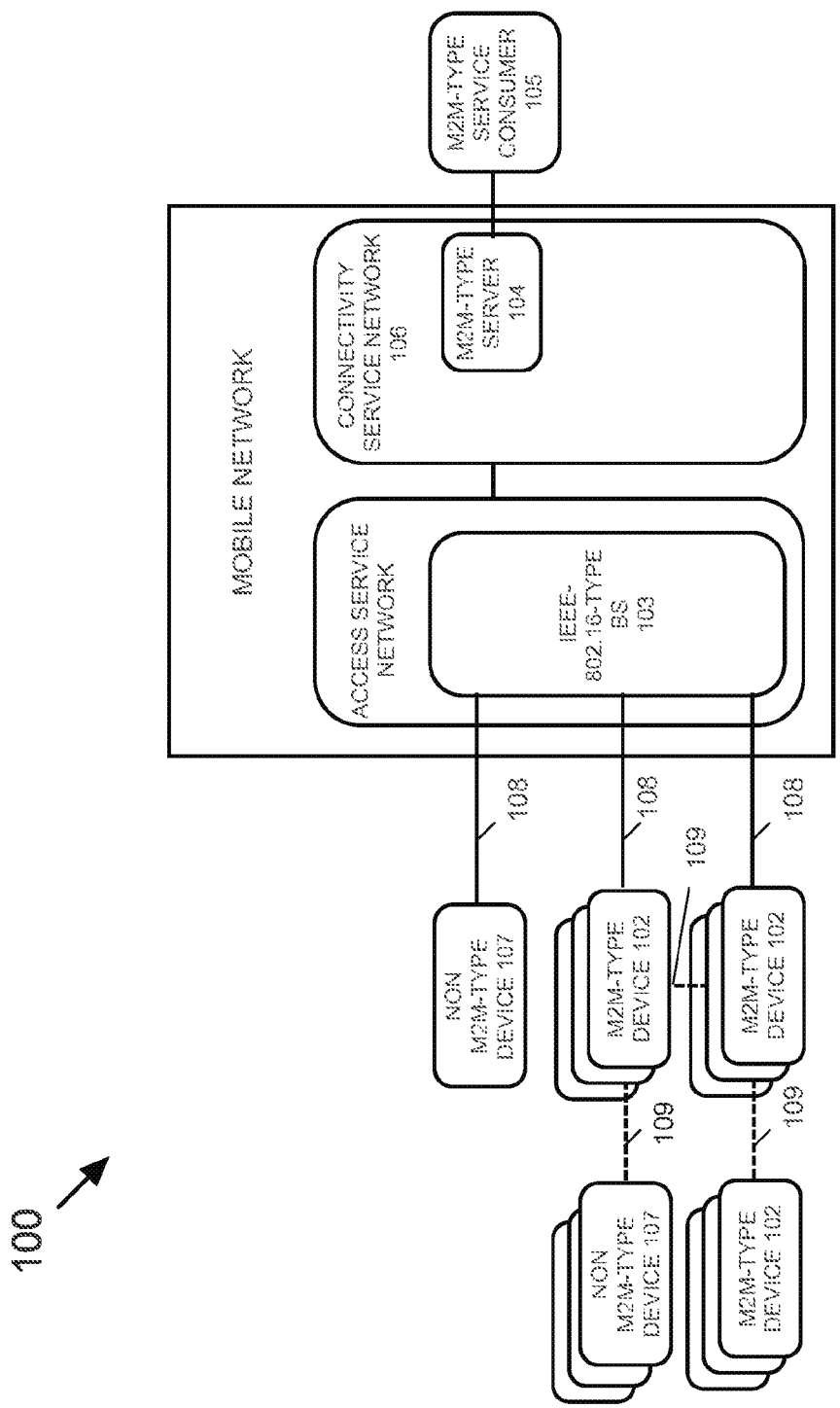
FIG. 1 depicts an exemplary high-level system configuration for an IEEE-802.16-based M2M-type communications network.

It will be appreciated that for simplicity and/or clarity of illustration, elements depicted in the figures have not necessarily been drawn to scale. For example, the dimensions of some of the elements may be exaggerated relative to other elements for clarity. The scaling of the figures does not represent precise dimensions and/or dimensional ratios of the various elements depicted herein. Further, if considered appropriate, reference numerals have been repeated among the figures to indicate corresponding and/or analogous elements.

DESCRIPTION OF THE EMBODIMENTS

Conventional communication techniques do not provide for a base station in an IEEE-802.16-type wireless communication network to designate a delegate M2M-type device of a group of M2M-type devices.

The subject matter disclosed herein relates to a technique for indicating an M2M group delegate from a base station in an IEEE-802.16-type wireless communication network, although it should be understood that the specific type of wireless communication network is not limited to an IEEE-802.16-type wireless communication network.

By designating an M2M group delegate, control signaling overhead is reduced and power consumption is reduced for most of the M2M devices that are part of the M2M group.

Embodiments of techniques described herein relate to a technique for indicating an M2M group delegate from a base station in an IEEE-802.16-type wireless communication network, although it should be understood that the specific type of wireless communication network is not limited to an IEEE-802.16-type wireless communication network. In the following description, numerous specific details are set forth to provide a thorough understanding of embodiments disclosed herein. One skilled in the relevant art will recognize, however, that the embodiments disclosed herein can be practiced without one or more of the specific details, or with other methods, components, materials, and so forth. In other instances, well-known structures, materials, or operations are not shown or described in detail to avoid obscuring aspects of the specification.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments.

Various operations may be described as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

The subject matter disclosed herein relates to a technique for indicating an M2M group delegate from a base station in an IEEE-802.16-type wireless communication network, although it should be understood that the specific type of wireless communication network is not limited to an IEEE-802.16-type wireless communication network. According to the subject matter disclosed herein, abuse station (BS) in such a communication network can page a group of M2M devices using a paging message that includes a M2M Group Identifier (MGM) and identifying one or more delegate M2M devices to perform network reentry, thereby reducing the control signaling overhead and reducing the power consumption for most of the M2M devices that are part of the M2M group. That is, in response to the paging message from the base station, one or more group delegates exchange control signaling with the base station in the name of the group for group network reentry. According to the subject matter disclosed herein, the base station (BS) indicates the one or more M2M group delegates by adding the identification of the one or more group as a Deregistration Identifier (DID) as part of an Advanced Air Interface-Paging Advertisement message.

Figure 2:
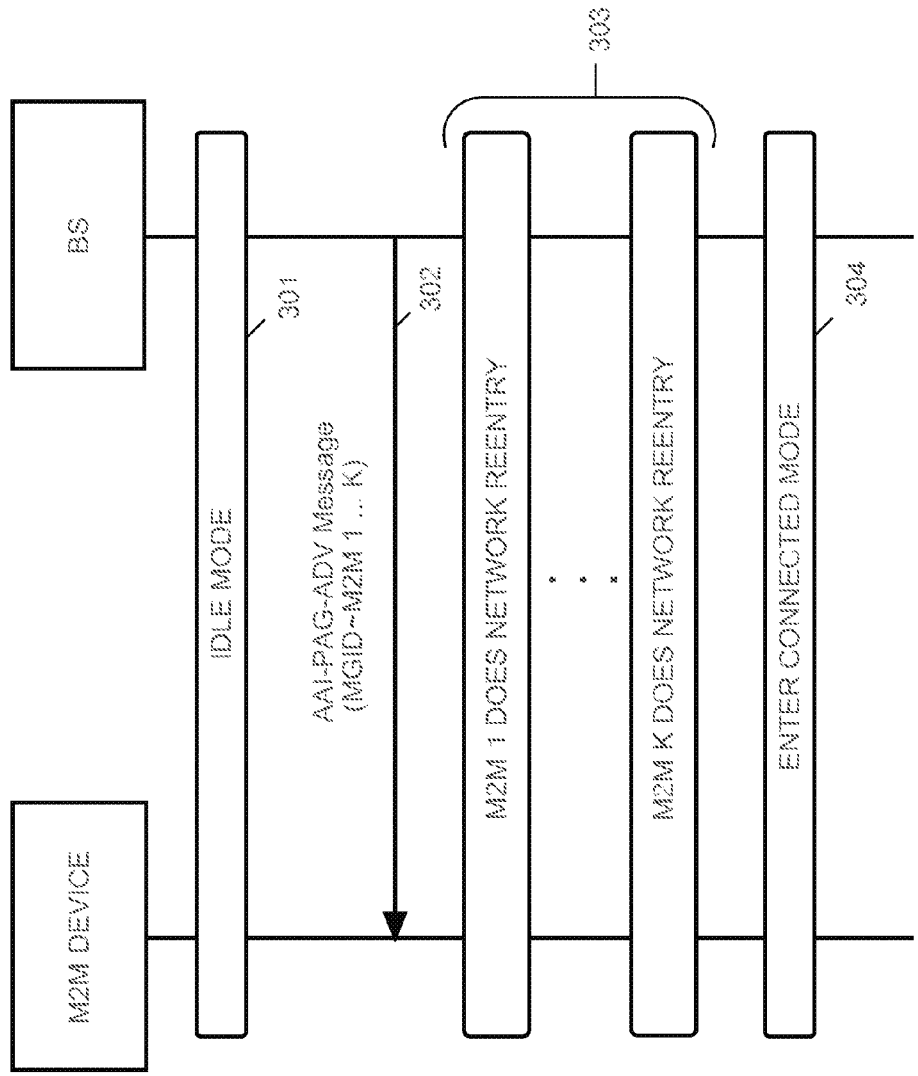
FIG. 2 depicts a conventional exemplary protocol sequence for performing group reentry without indicating an M2M group delegate from a base station according to the subject matter disclosed herein.

FIG. 2 depicts a conventional exemplary protocol sequence for performing group reentry without indicating an M2M group delegate from a base station according to the subject matter disclosed herein. At 201, the operational state of a base station BS and an associated M2M device, which is part of an M2M group (not shown), is an idle mode. That is, the M2M device is actively in an idle mode, as is all other M2M devices of the group, and the base station BS is aware that the M2M device and all other M2M devices of the group are in an idle mode. Consequently, the operational state existing between the M2M devices and the base station BS is an idle mode. At 202, the base station BS sends an AAI-PAG-ADV MGIP~M2M . . . K message that is targeted at the M2M group as identified by the contents of the MGID field, which identities the M2M devices of the grouped (i.e., M2M 1, . . . , M2M K) contained in the message.

At 203, the M2M group-based network reentry is initiated separately by each M2M device 1, . . . , K, indicated in the AAI-PAG-ADV message. Thus, the control signaling overhead is not reduced and power consumption for each of the M2M devices of the M2M group is similarly not reduced. Subsequently, at 204, each of the M2M devices of the M2M group is in an operational state of being connected to the network.

Figure 3:
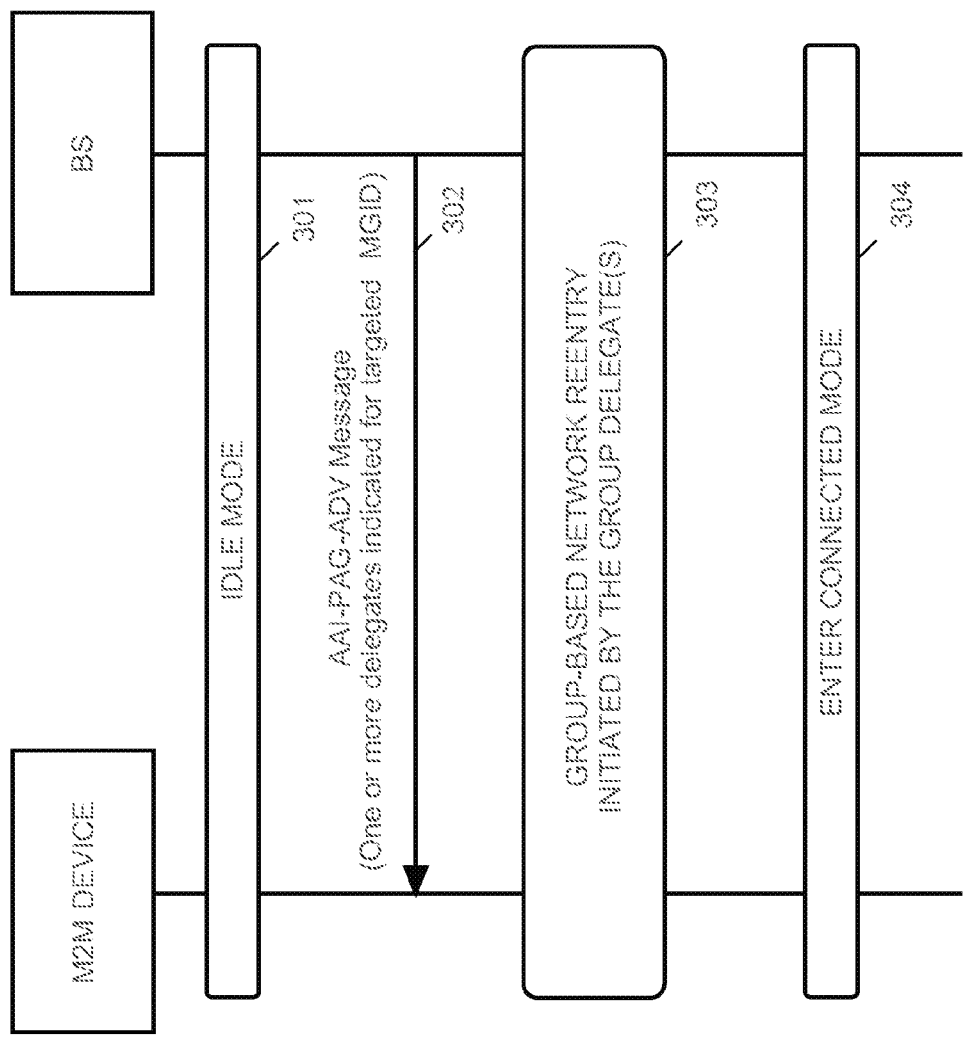
FIG. 3 depicts an exemplary protocol sequence for indicating an M2M group delegate from a base station for a group-based network reentry according to the subject matter disclosed herein.

FIG. 3 depicts an exemplary protocol sequence for indicating an M2M group delegate from a base station for a group-based network reentry according to the subject matter disclosed herein. At 301, the operational state of a base station BS and an associated M2M device, which is part of an M2M group (not shown), is an idle mode. That is, the M2M device is actively in an idle mode, whereas the base station BS is aware that the M2M device is in an idle mode. Consequently, the operational state existing between the M2M device and the base station BS is an idle mode. While at 301, the M2M device has not yet been designated to be the M2M delegate device for the M2M group. At 302, the base station BS sends an AAI-PAG-ADV message that is targeted at the M2M group as identified by MGM field contained in the message. The AAI-PAG-ADV message also contains information that identifies, in this example, the M2M device as the group delegate for group network reentry as a Deregistration Identifier (DID) type field of the AAI-PAG-ADV message. In another exemplary embodiment, the AAI-PAG-ADV message could contain information at identifies more than one M2M device as the group delegate for group network reentry.

At 303, the M2M group-based network reentry is initiated by the group delegate indicated in the AAI-PAG-ADV message. In one exemplary embodiment, the M2M group delegate(s) can respond by acknowledging the paging message. In another exemplary embodiment, the M2M group delegates would not respond by acknowledging the paging message. Subsequently, at 304, the M2M group is in an operational state of being connected to the network through the designated M2M group delegate.

Table 1 sets forth an exemplary format arrangement and exemplary field sizes for an AAI-PAG-ADV message that contains information for indicating one or more M2M delegates for an M2M group. It should be understood that the indicated field arrangement and exemplary field sizes could be adapted for each application.

TABLE 1

Exemplary AAI-PAG-ADV Message Field Descriptions

| Field | Size (bits) | Value/Description | Condition |
|---|---|---|---|
| ... | | | |
| For (j=0; j<Num_MGID; j++) { | | Num_MGID indicates the number of MGIDs included in this paging message [0 . . . 63] | Shall be included if the ABS sends DL multicast data for M2M after transmission of the AAI-PAG-ADV message. |
| MGID | 12 | M2M Group ID | |
| Zone Index | 2 | Zone Index corresponding to an M2M GROUP ZONE ID based on the implicit ordering of the M2M GROUP ZONE IDs in the broadcasted message | Present if ABS is part of more than one M2M group zone. |
| Action code | 2 | 0b00: Performing network reentry<br>0b01: Performing location update<br>0b10: Receiving multicast traffic<br>0b11: MGID re-assignment | |
| If(Action code == 0b00){ | | | |
| Num_Group_Delegate | 1-16 | No. of group delegates, 0, 1, . . . K-1 | |
| Group Delegate ID 0 | 1-16 | | |
| ... | | | |
| Group Delegate ID (K-1) | 1-16 | | |
| | 4 | Indicate the initial backoff window size for M2M devices | |
| M2M network access type | 2 | Indicate the network access scheme for M2M device<br>0b00: Resource allocation (i.e., Assignment A-MAP offset) for AAI-RNG-REQ, This type is only applicable to fixed M2M device (i.e., Localized_Idle_Mode flag was set to 1 at the idle mode initiation). Except fixed M2M device, mobile M2M device shall perform the contention-based ranging.<br>0b01: dedicated ranging channel allocation, S-RCH<br>0b10: dedicated ranging channel allocation, NS-RCH<br>0b11: No dedicated ranging channel | |
| If ( M2M network re-entry type==0b01 or 0b10){ | | | |
| Group paging change count | 2 | The value is increased whenever the whole M2M group is paged in a new round, the value rolls over from 0 to 3 | Group paging change count |
| Group access probability | 2 | 0b00: 25%<br>0b01: 50%<br>0b10: 100%<br>0b11: Reserved | |
| M2M ranging opportunity subframe index | 3 | Indicates the subframe index of the allocated ranging opportunity dedicated for M2M devices. | |
| Periodicy of the M2M ranging | 3 | Indicates the periodicy of the ranging dedicated for M2M devices.<br>0b000: transmission in every frame | |

TABLE 1-continued

Exemplary AAI-PAG-ADV Message Field Descriptions

| Field | Size (bits) | Value/Description | Condition |
|---|---|---|---|
| | | 0b001: transmission in the first frame in every superframe<br>0b010: transmission in the first frame in every even numbered superframe, i.e., mod(superframe number, 2) = 0<br>0b011: transmission in the first frame in every 4th superframe, i.e., mod(superframe number, 4) = 0<br>[0b100~0b111: reserved] | |

}
}
...

Figure 4:
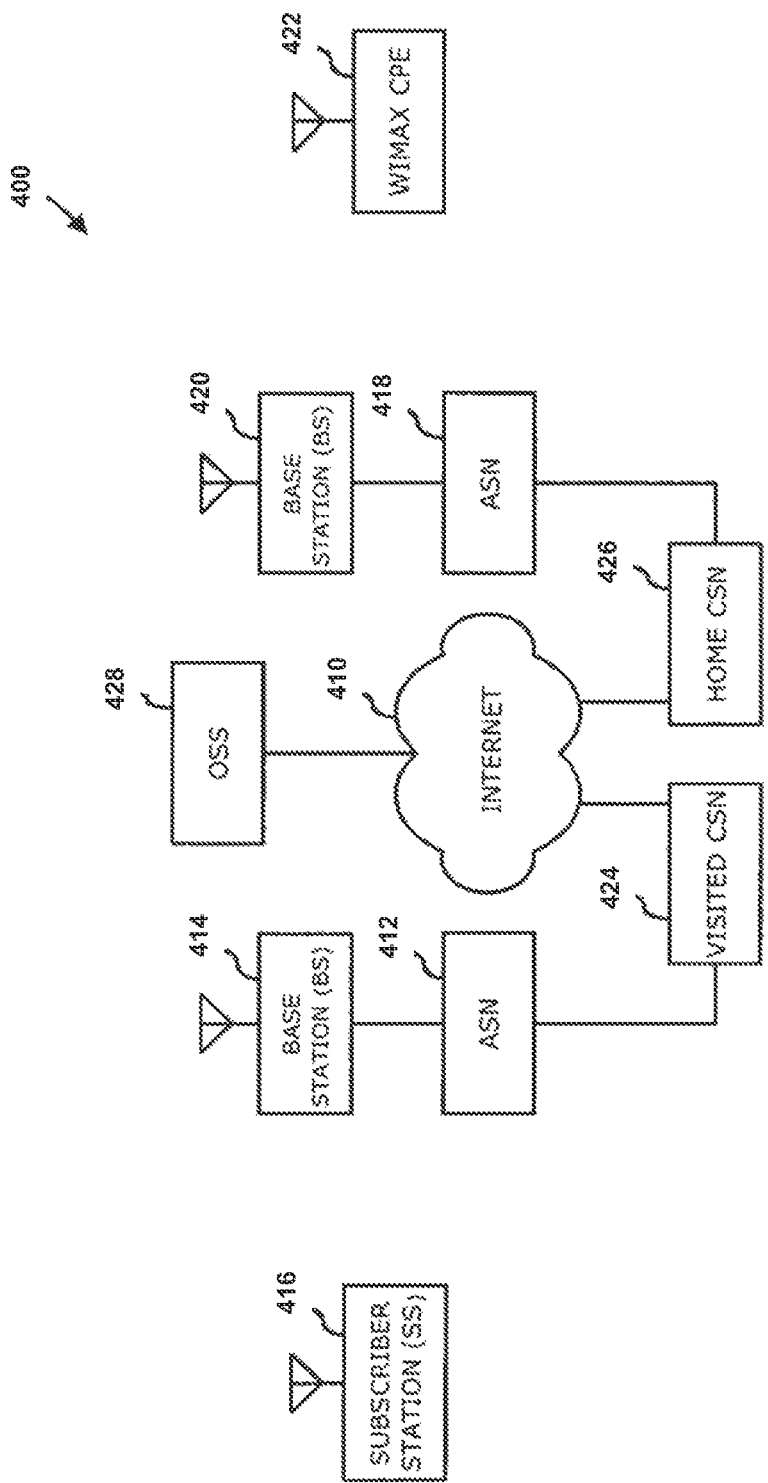
FIG. 4 depicts a block diagram of an exemplary configuration of a wireless network in accordance with one or more exemplary embodiments disclosed herein.

FIG. 4 depicts a block diagram of an exemplary configuration of a wireless network in accordance with one or more exemplary embodiments disclosed herein. One or more of the elements of wireless network 400 may utilize a M2M delegate designation technique according to the subject matter disclosed herein, such as base station 414, subscriber station 416, which could be an M2M-type device, base station 420, and/or customer premises equipment 422, which could be an M2M-type device. As shown in FIG. 4, network 400 may be an Internet-Protocol-type (IP-type) network comprising an Internet-type network 410, or the like, that is capable of supporting mobile wireless access and/or fixed wireless access to Internet 410. In one or more exemplary embodiments, network 400 may be in compliance with a Worldwide Interoperability for Microwave Access (WiMAX) standard or future generations of WiMAX, and in one particular embodiment may be in compliance with an Institute for Electrical and Electronics Engineers 802.16-based standard (for example, IEEE 802.16e), or an IEEE 802.11-based standard (for example, IEEE 802.11a/b/g/n standard), and so on. In one or more alternative exemplary embodiments, network 400 may be in compliance with a Third Generation Partnership Project Long Term Evolution (3GPP LTE) or a 3GPP2 Air Interface Evolution (3GPP2 AIE) standard. In general, network 400 may comprise any type of orthogonal-frequency-division-multiple-access-based (OFDMA-based) wireless network, for example, a WiMAX compliant network, a Wi-Fi Alliance Compliant Network, a digital subscriber-line-type (DSL-type) network, an asymmetric-digital-subscriber-line-type (ADSL-type) network, an Ultra-Wideband (UWB) compliant network, a Wireless Universal Serial Bus (USB) compliant network, a 4fi Generation (4G) type network, and so on, and the scope of the claimed subject matter is not limited in these respects. As an example of mobile wireless access, access service network (ASN) 412 is capable of coupling with base station (BS) 414 to provide wireless communication between subscriber station (SS) 416 and Internet 410. Subscriber station 416 may comprise a mobile-type device or information-handling system capable of wirelessly communicating via network 400, for example, a notebook-type computer, a cellular telephone, a personal digital assistant, an M2M-type device, or the like. ASN 412 may implement profiles that are capable of defining the mapping of network functions to one or more physical entities on network 400. Base station 414 may comprise radio equipment to provide radio-frequency (RF) communication with subscriber station 416, and may comprise, for example, the physical layer (PRY) and media access control (MAC) layer equipment in compliance with an IEEE 802.16e-type standard. Base station 414 may further comprise an IP backplane to couple to Internet 410 via ASN 412, although the scope of the claimed subject matter is not limited in these respects.

Network 400 may further comprise a visited connectivity service network (CSN) 424 capable of providing one or more network functions including, but not limited to, proxy and/or relay type functions, for example, authentication, authorization and accounting (AAA) functions, dynamic host configuration protocol (DHCP) functions, or domain-name service controls or the like, domain gateways, such as public switched telephone network (PSTN) gateways or Voice over Internet Protocol (VoIP) gateways, and/or Internet-Protocol-type (IP-type) server functions, or the like. These are, however, merely example of the types of functions that are capable of being provided by visited CSN or home CSN 426, and the scope of the claimed subject matter is not limited in these respects. Visited CSN 424 may be referred to as a visited CSN in the case, for example, in which visited CSN 424 is not part of the regular service provider of subscriber station 416, for example, in which subscriber station 416 is roaming away from its home CSN, such as home CSN 426, or, for example, in which network 400 is part of the regular service provider of subscriber station, but in which network 400 may be in another location or state that is not the main or home location of subscriber station 416. In a fixed wireless arrangement, WiMAX-type customer premises equipment (CPE) 422 may be located in a home or business to provide home or business customer broadband access to Internet 410 via base station 420, ASN 418, and home CSN 426 in a manner similar to access by subscriber station 416 via base station 414, ASN 412, and visited CSN 424, a difference being that WiMAX CPE 422 is generally disposed in a stationary location, although it may be moved to different locations as needed, whereas subscriber station may be utilized at one or more locations if subscriber station 416 is within range of base station 414 for example. It should be noted that CPE 422 need not necessarily comprise a WiMAX-type terminal, and may comprise other types of terminals or devices compliant with one or more standards or protocols, for example, as discussed herein, and in general may comprise a fixed or a mobile device. In accordance with one or more embodiments, operation support system (OSS) 428 may be part of network 400 to provide management functions for network 400 and to provide interfaces between functional entities of network 400. Network 400 of FIG. 4 is merely one type of wireless network showing a certain number of the components of network 400; however, the scope of the claimed subject matter is not limited in these respects.

Figure 5:
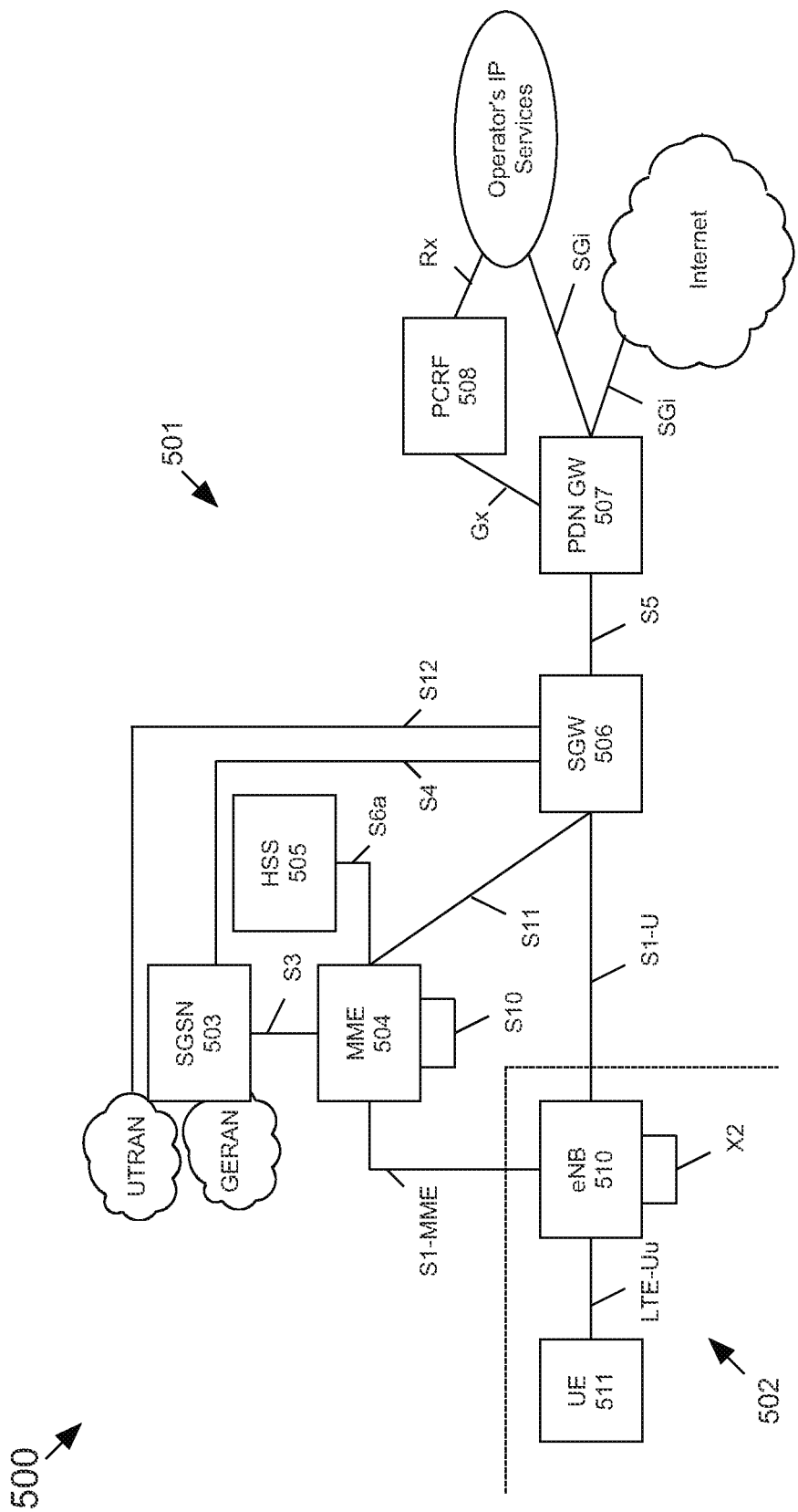
FIG. 5 shows an exemplary block diagram of the overall architecture of a 3GPP LTE network that utilizes an M2M delegate designation technique according to the subject matter disclosed herein.

FIG. 5 shows an exemplary block diagram of the overall architecture of a 3GPP LTE network 500 that utilizes an M2M delegate designation technique according to the subject matter disclosed herein. FIG. 5 also generally shows exemplary network elements and exemplary standardized interfaces. At a high level, network 500 comprises a core network (CN) 501 (also referred to as an evolved Packet System (EPC)), and an air-interface access network E-UTRAN 502. CN 501 is responsible for the overall control of the various User Equipment (UE) connected to the network and establishment of the bearers. CN 501 may include functional entities, such as a home agent HA and/or an ANDSF server or entity, although not explicitly depicted. E-UTRAN 502 is responsible for all radio-related functions.

The main exemplary logical nodes of CN 501 include, but are not limited to, a Serving GRRS Support Node 503, the Mobility Management Entity 504, a Home Subscriber Server (HSS) 505, a Serving Gate (SGW) 506, a PDN Gateway 507 and a Policy and Charging Rules Function (PCRF) Manager 508. The functionality of each of the network elements of CN 401 is well known and is not described herein. Each of the network elements of CN 501 are interconnected by well-known exemplary standardized interfaces, some of which are indicated in FIG. 5, such as interfaces S3, S4, S5, etc., although not described herein.

While CN 501 includes many logical nodes, the E-UTRAN access network 502 is formed by one node, the evolved NodeB (base station (BS), eNB or eNodeB) 510, which connects to one or more User Equipment (UE) 511, of which only one is depicted in FIG. 5. UE 511 is also referred to herein as a wireless device (WD) and/or a subscriber station (SS), and can include an M2M-type device. In one exemplary configuration, a single cell of an E-UTRAN access network 502 provides one substantially localized geographical transmission point (having multiple antenna devices) that provides access to one or more UEs. In another exemplary configuration, a single cell of an E-UTRAN access network 502 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there is no centralized controller in E-UTRAN; hence the E-UTRAN architecture is said to be flat. The eNBs are normally interconnected with each other by an interface known as "X2" and to the EPC by an S1 interface. More specifically, an eNB is connected to MME 504 by an S1-MME interface and to SGW 506 by an S1-U interface. The protocols that run between the eNBs and the UEs are generally referred to as the "AS protocols." Details of the various interfaces are well known and not described herein.

The eNB 510 hosts the PHYsical (PHY), Medium Access Control (MAC), Radio Link Control (RLC), and Packet Data Control Protocol (PDCP) layers, which are not shown in FIG. 5, and which include the functionality of user-plane header-compression and encryption. The eNB 510 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DL/UL user plane packet headers.

The RRC layer in eNB 510 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 511, generates pages for UEs 511 over the air, broadcasts system information, controls UE measurement reporting, such as the periodicity of Channel Quality Information (CQI) reports, and allocates cell-level temporary identifiers to active UEs 511. The RRC layer also executes transfer of UE context from a source eNB to a target eNB during handover, and provides integrity protection for RRC messages. Additionally, the RRC layer is responsible for the setting up and maintenance of radio bearers.

Figure 6:
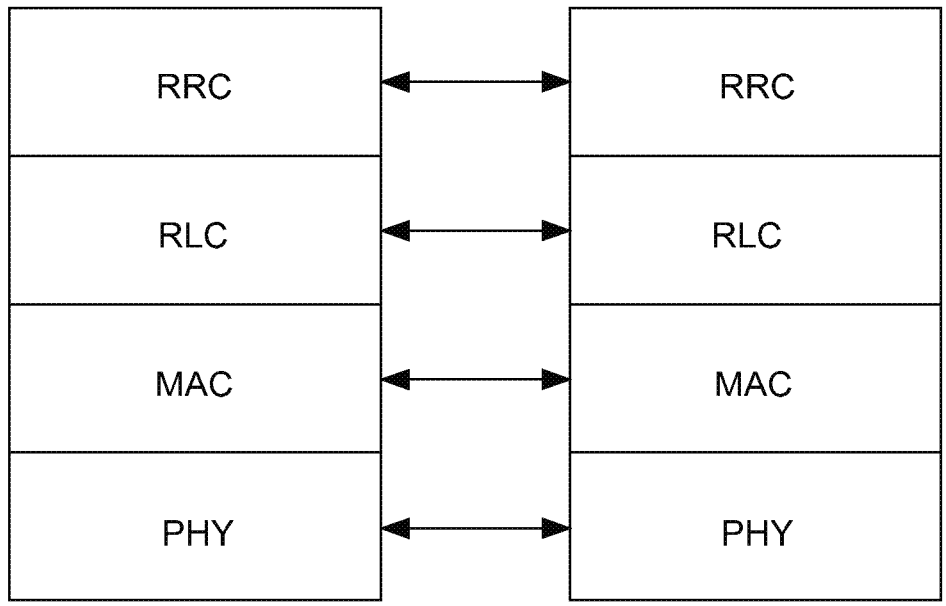
FIGS. 6 and 7 respectively depict exemplary radio interface protocol structures between a LIE and an eNodeB that are based on a 3GPP-type radio access network standard and that utilize an M2M delegate designation technique according to the subject matter disclosed herein.
Figure 7:
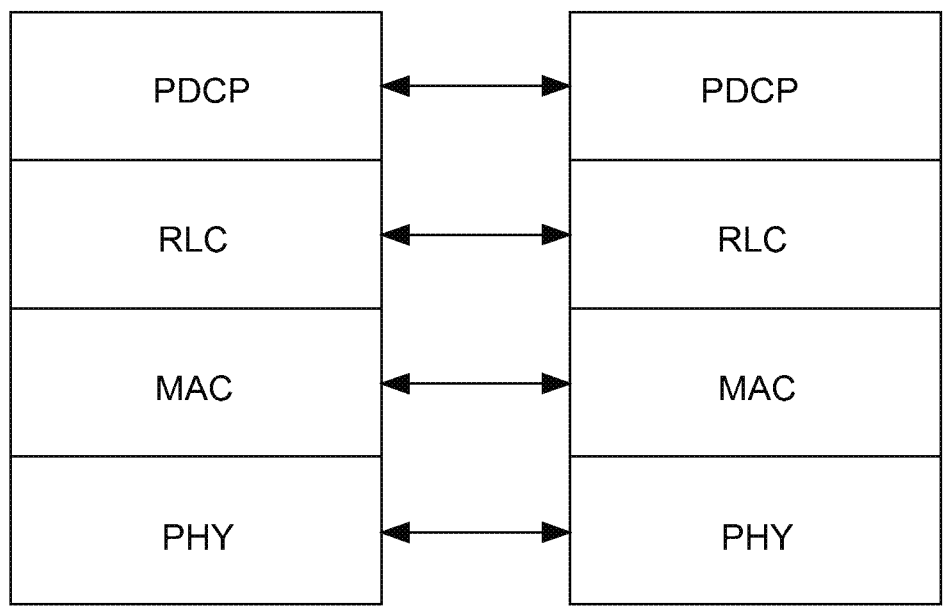

FIGS. 6 and 7 respectively depict exemplary radio interface protocol structures between a UE and an eNodeB that are based on a 3GPP-type radio access network standard and that utilize an M2M delegate designation technique according to the subject matter disclosed herein. More specifically, FIG. 6 depicts individual layers of a radio protocol control plane and FIG. 7 depicts individual layers of a radio protocol user plane. The protocol layers of FIGS. 6 and 7 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver, is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets, such as IPv4 or IPv6 packets, in a radio interval with a narrow bandwidth. As a result, only information required for a header part of data can be transmitted, so that transmission efficiency of the radio interval can be increased. In addition, in an LTE-based system, the PDCP layer performs a security function that includes a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C-plane, and the DRB is used as a transmission passage of user data in the U-plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HARQ) ACK or NACK Scheduling Request (SR) and Channel Quality indicator (CQI) report information, received from first and second layers (L1 and L2).

Figure 8:
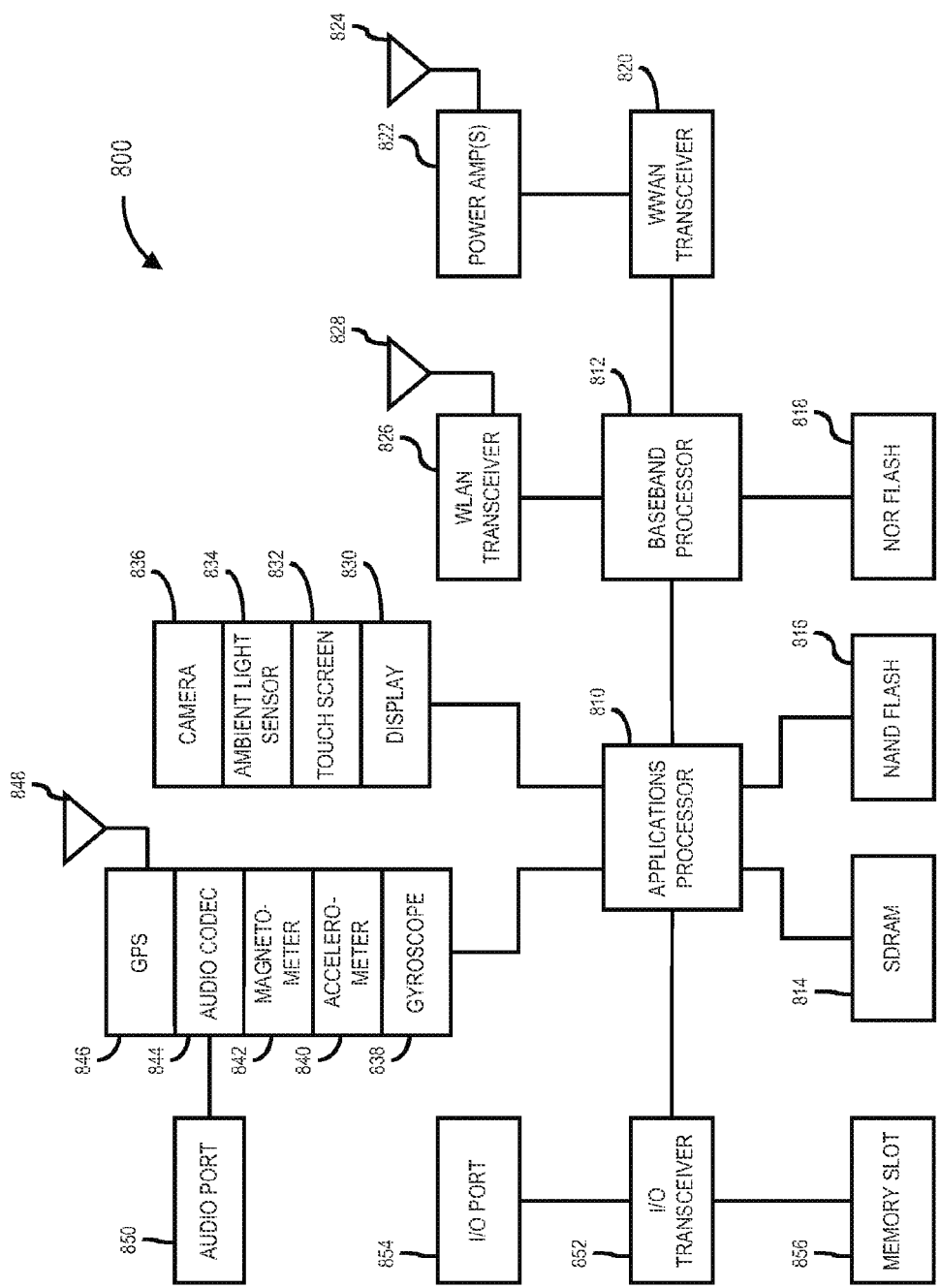
FIG. 8 depicts an exemplary functional block diagram of an information-handling system that utilizes are M2M delegate designation technique according to the subject matter disclosed herein.

FIG. 8 depicts an exemplary functional block diagram of an information-handling system 800 that utilizes an M2M delegate designation technique according to the subject matter disclosed herein. Information-handling system 800 of FIG. 8 may tangibly embody one or more of any of the exemplary network elements and/or functional entities of the network as shown in and described with respect to FIG. 4, and/or core network 501 as shown in and described with respect to FIG. 5. For example, information-handling system 800 may represent the components of an M2M-type device as embodied by subscriber station 416, CPE 422, base stations 414 and 420, eNB 510, and/or UE 511, with greater or fewer components depending on the hardware specifications of the particular device or network element. Although information-handling system 800 represents one example of several types of computing platforms, information-handling system 800 may include more or fewer elements and/or different arrangements of elements than shown in FIG. 8, and the scope of the claimed subject matter is not limited in these respects.

In one or more embodiments, information-handling system 800 may comprise one or more applications processor 810 and a baseband processor 812. Applications processor 810 may be utilized as a general purpose processor to run applications and the various subsystems for information handling system 800. Applications processor 810 may include a single core or alternatively may include multiple processing cores wherein one more of the cores may comprise a digital signal processor or digital signal processing core. Furthermore, applications processor 810 may include a graphics processor or coprocessor disposed on the same chip, or alternatively a graphics processor coupled to applications processor 810 may comprise a separate, discrete graphics chip. Applications processor 810 may include on-board memory, such as cache memory, and further may be coupled to external memory devices such as synchronous dynamic random access memory (SDRAM) 814 for storing and/or executing applications during operation, and NAND flash 816 for storing applications and/or data even when information handling system 800 is powered off. Baseband processor 812 may control the broadband radio functions for information-handling system 800. Baseband processor 812 may store code for controlling such broadband radio functions in a NOR flash 818. Baseband processor 812 controls a wireless wide area network (WWAN) transceiver 820 which is used for modulating and/or demodulating broadband network signals, for example for communicating via a 3GPP LTE network or the like as discussed herein with respect to FIG. 5. The WWAN transceiver 820 couples to one or more power amplifiers 822 that are respectively coupled to one or more antennas 824 for sending and receiving radio-frequency signals via the WWAN broadband network. The baseband processor 812 also may control a wireless local area network (WLAN) transceiver 826 coupled to one or more suitable antennas 828 and that may be capable of communicating via a Bluetooth-based standard, an IEEE 802.11-based standard, an IEEE 802.16-based standard, an IEEE 802.18-based wireless network standard, an LTE-based wireless network standard, a 3GPP-based protocol wireless network, a Third Generation Partnership Project Long Term Evolution (3GPP LTE) based wireless network standard, a 3GPP2 Air Interface Evolution (3GPP2 AIE) based wireless network standard, a UMTS-based protocol wireless network, a CDMA2000-based protocol wireless network, a GSM-based protocol wireless network, a cellular-digital-packet-data-based (CDPD-based) protocol wireless network, or a Mobitex-based protocol wireless network, or the like. It should be noted that these are merely example implementations for applications processor 810 and baseband processor 812, and the scope of the claimed subject matter is not limited in these respects. For example, any one or more of SDRAM 814, NAND flash 816 and/or NOR flash 818 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, applications processor 810 may drive a display 830 for displaying various information or data, and may further receive touch input from a user via a touch screen 832 for example via a finger or a stylus. An ambient light sensor 834 may be utilized to detect an amount of ambient light in which information-handling system 800 is operating, for example to control a brightness or contrast value for display 830 as a function of the intensity of ambient light detected by ambient light sensor 834. One or more cameras 836 may be utilized to capture images that are processed by applications processor 810 and/or at least temporarily stored in NAND flash 816. Furthermore, applications processor may couple to a gyroscope 838, accelerometer 840, magnetometer 842, audio coder/decoder (CODEC) 844, and/or global positioning system (GPS) controller 846 coupled to an appropriate GPS antenna 848, for detection of various environmental properties including location, movement, and/or orientation of information handling system 800. Alternatively, controller 846 may comprise a Global Navigation Satellite System (GNSS) controller. Audio CODEC 744 may be coupled to one or more audio ports 850 to provide microphone input and speaker outputs either via internal devices and/or via external devices coupled to information-handling system via the audio ports 850, for example via a headphone and microphone jack. In addition, applications processor 810 may couple to one or more input/output (I/O) transceivers 852 to couple to one or more I/O ports 854 such as a universal serial bus (USB) port, a high-definition multimedia interface (HDMI) port, a serial port, and so on. Furthermore, one or more of the I/O transceivers 852 may couple to one or more memory slots 856 for optional removable memory, such as secure digital (SD) card or a subscriber identity module (SIM) card, although the scope of the claimed subject matter is not limited in these respects.

Figure 9:
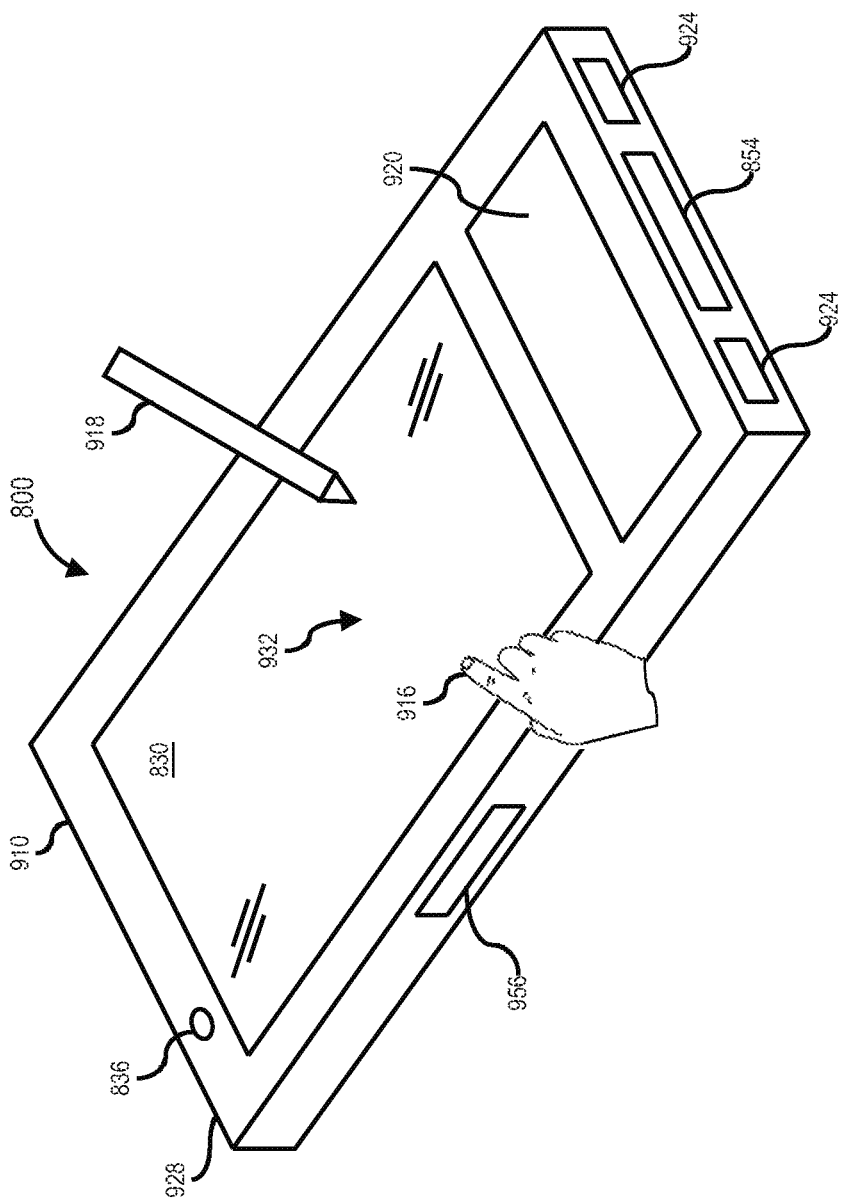
FIG. 9 depicts an isometric view of an exemplary embodiment of the information-handling system of FIG. 8 that optionally may include a touch screen in accordance with one or more embodiments.

FIG. 9 depicts an isometric view of an exemplary embodiment of the information-handling system of FIG. 8 that optionally may include a touch screen in accordance with one or more embodiments. FIG. 9 shows an example implementation of information-handling system 800 of FIG. 8 tangibly embodied as a cellular telephone, smartphone, or tablet-type device or the like. In one or more embodiments, the information-handling system 800 may comprise any one of the infrastructure nodes, subscriber station 416, CPE 422, mobile station LE 511 of FIG. 5, and/or an M2M-type device, although the scope of the claimed subject matter is not limited in this respect. The information-handling system 800 may comprise a housing 910 having a display 830 that may include a touch screen 832 for receiving tactile input control and commands via a finger 916 of a user and/or a via stylus 918 to control one or more applications processors 810. The housing 910 may house one or more components of information-handling system 800, for example, one or more applications processors 810, one or more of SDRAM 814, NAND flash 816, NOR flash 818, baseband processor 812, and/or WWAN transceiver 820. The information-handling system 800 further may optionally include a physical actuator area 920 which may comprise a keyboard or buttons for controlling information-handling system via one or more buttons or switches. The information-handling system 800 may also include a memory port or slot 856 for receiving non-volatile memory, such as flash memory, for example, in the form of a secure digital (SD) card or a subscriber identity module (SIM) card. Optionally, the information-handling system 800 may further include one or more speakers and/or microphones 924 and a connection port 854 for connecting the information-handling system 800 to another electronic device, dock, display, battery charger, and so on. Additionally, information-handling system 800 may include a headphone or speaker jack 928 and one or more cameras 936 on one or more sides of the housing 910. It should be noted that the information-handling system 800 of FIGS. 8 and 9 may include more or fewer elements than shown, in various arrangements, and the scope of the claimed subject matter is not limited in this respect.

Figure 10:
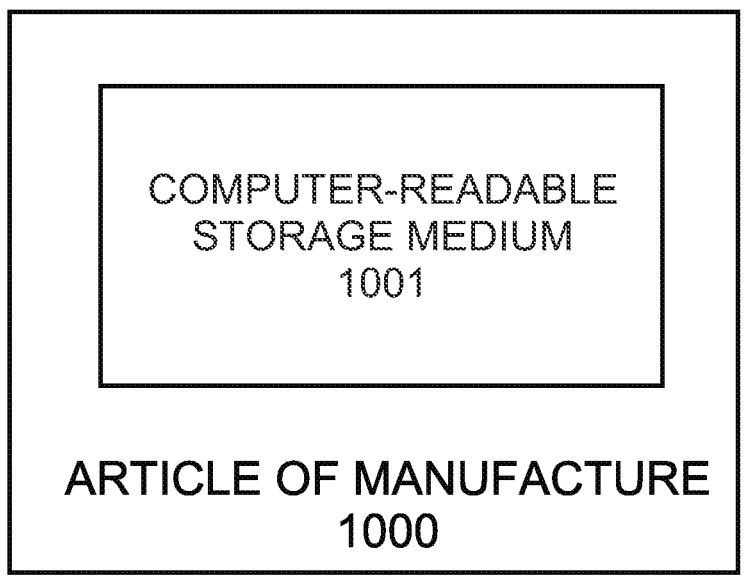
FIG. 10 depicts an exemplary embodiment of an article of manufacture comprising a non-transitory computer-readable storage medium having stored thereon computer-readable instructions that, when executed by a computer-type device, results in any of the various techniques and methods according to the subject matter disclosed herein.

FIG. 10 depicts an exemplary embodiment of an article of manufacture 1000 comprising a non-transitory computer-readable storage medium 1001 having stored thereon computer-readable instructions that, when executed by a computer-type device, results in any of the various techniques and methods according to the subject matter disclosed herein. Exemplary computer-readable storage mediums that could be used for computer-readable storage medium 901 could be, but are not limited to, a semiconductor-based memory, an optically based memory, a magnetic-based memory, or a combination thereof.

These modifications can be made in light of the above detailed description. The terms used in the following claims should not be construed to limit the scope to the specific embodiments disclosed in the specification and the claims. Rather, the scope of the embodiments disclosed herein is to be determined by the following claims, which are to be construed in accordance with established doctrines of claim interpretation.

The invention claimed is:

1. A machine-to-machine-type (M2M-type) device, comprising:
    a transceiver to receive, from a base station that is part of a wireless network, information designating the M2M-type device to be a delegate for group network reentry for a group of M2M-type devices with which the M2M-type device is associated, wherein the transceiver is configured to receive the information designation the M2M device to be a delegate for group reentry while the group of M2M-type devices are in an idle mode; and
    a processor coupled to the transceiver to transmit to the base station a M2M-type group-based reentry communication in response to the received information designating the M2M-type device to be the delegate;
    wherein the information designating the M2M-type device to be the delegate comprises information contained in a paging message received from the base station, wherein the paging message comprises an Advanced Air Interface-Paging Advertisement (AAI-PAG-ADV) message, and wherein the information designating the M2M-type device to be the delegate is contained in a Device Deregistration type field of the AAI-PAG-ADV message.

2. The M2M-type device according to claim 1, wherein the processor is further capable of generating an acknowledgement message for the transceiver to send to the base station.

3. The M2M-type device according to claim 1, wherein the paging message comprises an Advanced Air Interface-Paging Advertisement (AAI-PAG-ADV) message, and
wherein the group of the M2M-type devices is identified in a Machine Group ID (MGID) of the AAI-PAG-ADV message.

4. A method, comprising:
sending from a base station in a wireless network to at least one machine-to-machine-type (M2M-type) device information designating the at least one M2M-type device to be a delegate for group network reentry for a group of M2M-type devices with which the at least one M2M-type device is associated; and
receiving M2M-type group-based network reentry communication from the at least one M2M-type device;
wherein the information designating the at least one M2M-type device to be the delegate comprises a paging message, wherein the paging message comprises an Advanced Air Interface-Paging Advertisement (AAI-PAG-ADV) message, and wherein the information designating the at least one M2M-type device to be the delegate is contained in a Device Deregistration type field of the AAI-PAG-ADV message.

5. The method according to claim 4, further comprising receiving an acknowledgement message from the at least one M2M-type device.

6. The method according to claim 4, wherein the paging message comprises an Advanced Air Interface-Paging Advertisement (AAI-PAG-ADV) message, and
wherein the group of the M2M-type devices is identified in a Machine Group ID (MGID) of the AAI-PAG-ADV message.

7. A method, comprising:
receiving from a base station in a wireless network at least one machine-to-machine-type (M2M-type) device information designating the at least one M2M-type device to be a delegate for group network reentry for a group of M2M-type devices with which the at least one M2M-type device is associated;
generating a M2M-type group-based reentry communication in response to the received information designating the M2M-type device to be the delegate; and
sending the M2M-type group-based reentry communication to the base station;
wherein the information designating the at least one M2M-type device to be the delegate comprises a paging message, wherein the paging message comprises an Advanced Air Interface-Paging Advertisement (AAI-PAG-ADV) message, and wherein the information designating the at least one M2M-type device to be the delegate is contained in a Device Deregistration type field of the AAI-PAG-ADV message.

8. The method according to claim 7, further comprising sending an acknowledgement message from the at least one M2M-type device.

9. The method according to claim 7, further comprising sending M2M-type group-based network reentry communications from the at least one M2M-type device to the base station.

10. The method according to claim 7, wherein the paging message comprises an Advanced Air Interface-Paging Advertisement (AAI-PAG-ADV) message, and
wherein the group of the M2M-type devices is identified in a Machine Group ID (MGID) of the AAI-PAG-ADV message.

11. An article comprising:
a non-transitory computer-readable medium having stored thereon instructions that, if executed, result in at least the following:
sending from a base station in a wireless network to at least one machine-to-machine-type (M2M-type) device information designating the at least one M2M-type device to be a delegate for group network reentry for a group of M2M-type devices with which the at least one M2M-type device is associated; and
receiving an acknowledgement message from the at least one M2M-type device;
wherein the information designating the at least one M2M-type device to be the delegate comprises a paging message, wherein the paging message comprises an Advanced Air Interface-Paging Advertisement (AAI-PAG-ADV) message, and wherein the information designating the at least one M2M-type device to be the delegate is contained in a Device Deregistration type field of the AAI-PAG-ADV message.

12. The article according to claim 11, further comprising receiving M2M-type group-based network reentry communication from the at least one M2M-type device.

13. The article according to claim 11, wherein the paging message comprises an Advanced Air Interface-Paging Advertisement (AAI-PAG-ADV) message, and
wherein the group of the M2M-type devices is identified in a Machine Group ID (MGID) of the AAI-PAG-ADV message.

14. An article comprising:
a non-transitory computer-readable medium having stored thereon instructions that, if executed, result in at least the following:
receiving from a base station in a wireless network at least one machine-to-machine-type (M2M-type) device information designating the at least one M2M-type device to be a delegate for group network reentry for a group of M2M-type devices with which the at least one M2M-type device is associated;
generating a M2M-type group-based reentry communication in response to the received information designating the M2M-type device to be the delegate; and
sending the M2M-type group-based reentry communication to the base station;
wherein the information designating the at least one M2M-type device to be the delegate comprises a paging message, wherein the paging message comprises an Advanced Air Interface-Paging Advertisement (AAI-PAG-ADV) message, and wherein the information designating the at least one M2M-type device to be the delegate is contained in a Device Deregistration type field of the AAI-PAG-ADV message.

15. The article according to claim 14, further comprising sending an acknowledgement message from the at least one M2M-type device.

16. The article according to claim 14, further comprising sending M2M-type group-based network reentry communications from the at least one M2M-type device to the base station.

17. The article according to claim 14, wherein the paging message comprises an Advanced Air Interface-Paging Advertisement (AAI-PAG-ADV) message, and
wherein the group of the M2M-type devices is identified in a Machine Group ID (MGID) of the AAI-PAG-ADV message.

* * * * *